United States Patent [19]
Taylor

[11] Patent Number: 5,192,547
[45] Date of Patent: Mar. 9, 1993

[54] ANIMAL FEED CONTAINING SELECTED MONTMORILLONITE CLAY AS ADDITIVE AND METHOD FOR SELECTING THE CLAY

[75] Inventor: Dennis R. Taylor, Houston, Tex.

[73] Assignee: Engelhard Corporation, Iselin, N.J.

[21] Appl. No.: 590,900

[22] Filed: Oct. 1, 1990

[51] Int. Cl.$^5$ .............................................. A23K 1/18
[52] U.S. Cl. ........................................ 424/438; 426/2; 426/74
[58] Field of Search ...................... 424/438; 426/2, 74, 426/271, 623, 630

[56] References Cited

U.S. PATENT DOCUMENTS

| | | | |
|---|---|---|---|
| 3,687,680 | 8/1972 | Krchnavi | 426/2 |
| 4,711,868 | 12/1987 | Shyr et al. | 502/235 |
| 4,752,596 | 6/1988 | Bergna et al. | 502/64 |
| 4,976,977 | 12/1990 | Johnson et al. | 426/96 |

FOREIGN PATENT DOCUMENTS 3810004 10/1989 Fed. Rep. of Germany.
9113555 9/1991 World Int. Prop. O..

OTHER PUBLICATIONS

Phillips et al., Poultry Sci., 1988, vol. 67, pp. 243-247.

Primary Examiner—Thurman K. Page
Assistant Examiner—D. Gabrielle Phelan
Attorney, Agent, or Firm—Inez L. Moselle

[57] ABSTRACT

A correlation is established between aflatoxin B1 binding on raw montmorillonite clays and the ratio of their surface acidities divided by their porosities for surface acid sites whose pKa values fall in the range 5.0-6.8 (i.e. weakly acidic) and porosities for pores whose diameters fall in the region 50-600 A. This information provides a method for preselecting clay additives for animal feeds which have enhanced toxin binding capacity.

5 Claims, 1 Drawing Sheet

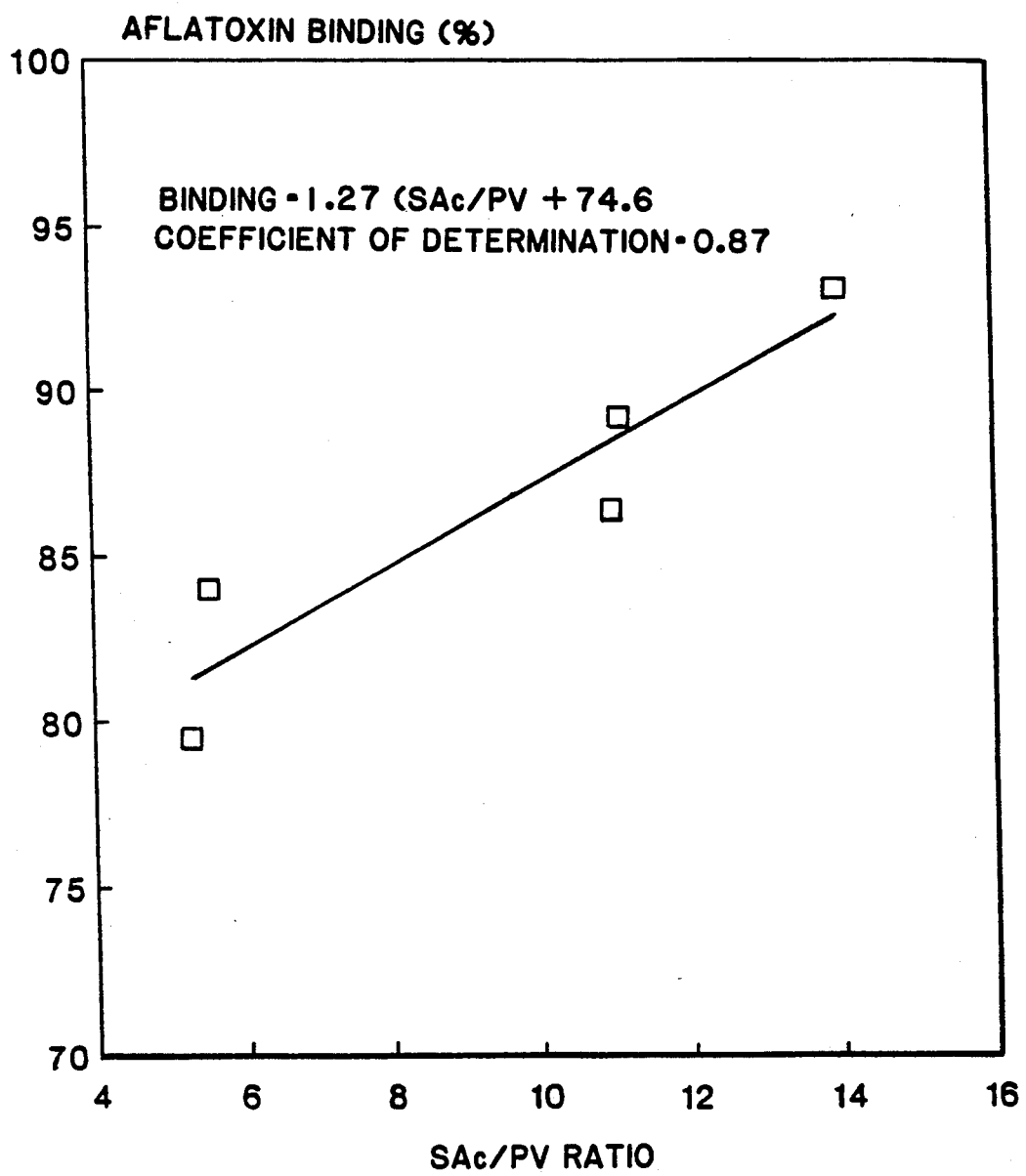

ANIMAL FEED CONTAINING SELECTED MONTMORILLONITE CLAY AS ADDITIVE AND METHOD FOR SELECTING THE CLAY

RELATED APPLICATIONS

This application is related to U.S. Ser. No. 07/552,715, filed Jul. 16, 1990.

BACKGROUND OF THE INVENTION

This invention relates to a method for inactivating mycotoxins which may be present as contaminants in dry animal feeds by adding a selected type of montmorillonite clay. More specifically, the selected clay is a calcium montmorillonite clay in which the ratio of surface acidity (as determined by Hammett indicators in the 5.0–6.8 pKa range) to pore volume (in the 50–600 Angstrom range) is above 5 and is preferably above 10.

Mycotoxins, chemical substances produced by ubiquitous fungi, can make the difference between profit and loss to the poultry and livestock industries. Animals are extremely vulnerable to mycotoxins due to the common practice of diversion of mycotoxin contaminated agricultural commodities to animal feed. Thus, mycotoxicoses, or mycotoxin-induced diseases, frequently occur in animals.

It is readily apparent from a review of scientific literature that the most studied and prevalent of these agents are the aflatoxins, a group of closely related polysubstituted coumarin derivatives, which are biosynthesized by *flavis* and *parasiticus* species of Ascergillus fungi. The aflatoxins have invoked much concern as toxic food and feedborne agents following the discovery that they: 1) are potent carcinogens and mutagens, 2) are stable in foods and feeds and are relatively unaffected by a variety of processing procedures, 3) can be found as residues in the tissues of animals and humans, and 4) are associated with animal and human disease.

A preponderance of poultry and livestock exposure to aflatoxins is chronic in nature and occurs through the ingestion of low levels of these chemicals such as "marginally contaminated" rations which do not increase the mortality rate nor result in obvious signs of disease. Instead, chronic exposure to aflatoxins results in economically important effects in animals such as depression of growth rates, feed conversion and alteration of immunocompetency which can result in increased susceptibility to infection and decreased ability to resist stress.

Numerous approaches to reduction of aflatoxin levels in agricultural commodities have been experimentally assessed. These include mixing and dilution with aflatoxin-free grains in order to obtain a level within regulatory guidelines; physical methods of separation such as cleaning, density segregation and preferential fragmentation; solvent extraction; biological inactivation; thermal inactivation; and chemical inactivation with a variety of acids, aldehydes, oxidizing agents and alkalis. These approaches have been relatively unsuccessful on a commercial scale due to lack of efficacy, economic constraints of the protocol, unacceptable alteration of feed quality, or the introduction of potentially deleterious substances. Consequently, simple, cost effective, practical and safe processes by which animal feeds can be decontaminated or detoxified are in great demand.

Clays such as montmorillonite have previously been incorporated into poultry feed at levels as low as one percent of the animal ration as in U.S. Pat. No. 3,687,680. Effects accompanying the addition of montmorillonite included increased growth rate and body weight of the chickens and reduced mortality rate. Dietary additions of zeolites (Smith, *J. Animal Science.* 1980 Vol 50(2), pp. 278–285), bentonite (Carson, *M. S. Thesis University of Guelph*, Canada 1982) and spent bleaching clay from canola oil refining (Smith, *Can. J. Animal Science.* 1984, Vol. 64, pp. 725–732), have been shown to diminish the adverse effects of T-2 toxin and zearalenone in rats and immature swine. The adsorption of aflatoxin B1 from various liquid media by a variety of phyllosilicates, including montmorillonites, has been reported (Masimanco et al., *Ann. de Nutrition et Alimentation*, 1973 Vol. 3, pp. 137–147). A detailed study (Phillips, et al., *Poultry Sci.*. 1988, Vol. 67, pp. 243–247) using a range of minerals including montmorillonites has shown that various members of the series exhibit differing levels of activity in vivo and in vitro for the adsorption of aflatoxin. The calcium montmorillonite identified as Clay A in the accompanying table has been supplied commercially as a feed additive.

It had been observed that calcium montmorillonites (with high exchangeable divalent plus trivalent/monovalent cation ratios) were superior to sodium montmorillonites (with low divalent plus trivalent/monovalent cation ratios). It has been recognized that even calcium montmorillonites vary significantly in their ability to adsorb aflatoxins and that there is indeed an appreciable difference between chemically similar montmorillonie clays. However, no ready explanation was available to guide a determination as to which physical or chemical property was responsible. Among various calcium montmorillonite in situ binding capacity could not be correlated with any single physiochemical property.

Accordingly, it is the object of the instant invention to provide a means for selecting among the wide varieties of clays those montmorillonite clays which are most effective in adsorbing mycotoxins, especially aflatoxins.

SUMMARY OF THE INVENTION

This invention relates to a method for identifying raw montmorillonite clays which will exhibit high affinity for the in vitro adsorption of aflatoxin B1. The invention relates also to dry animal feed compositions containing mycotoxins and including raw montmorillonite clays which will enhance adsorption of mycotoxins originally in the feed.

The present inventor has discovered that montmorillonite clays having greatest effectiveness in adsorbing mycotoxins, especially aflatoxins, are those in which the ratio of surface acidity (SAc) divided by pore volume (PV) is greater than 6, preferably greater than 10, for surface acid sites in the range of 5.0 to 6.8 (i.e., weakly acidic) and porosities are for pores whose diameters fall in the range of 50–600 Angstrom units, the clay being further characterized by having a ratio of divalent plus trivalent exchangeable cations to exchangeable monovalent cations above 7.

In accordance with this invention such selected montmorillonite clay is used as an animal feed additive to bind mycotoxins, such as aflatoxins, which are ingested in conjunction with animal feed. It is believed that the clay bound mycotoxin is not significantly adsorbed during digestion and it is then excreted with the binding clay in the feces of the animal.

The clay additives of this invention are used in minimal amounts with biodegradable animal feed for providing protection against mycotoxicoses during ingestion and digestion of the animal feed which is contaminated with mycotoxins, particularly aflatoxins. The additives of the present invention are combined with a substantially complete animal ration in minor amount, for example an amount ranging from 0.05 to 1.5 weight percent of the ration, preferably 0.1 to 0.5 weight percent, most preferably 0.2 to 0.6 weight percent of the feed ration, all weights being expressed on a day weight basis, the clay weight being the weight percent loss on drying at 110° C. for 4 hours.

Optionally, the montmorillonite particles are coated with a minor amount of a water-soluble sequestering agent in an amount sufficient to enhance the mycotoxin inactivating capacity of the clay mineral. The, teaching of copending U.S. Ser. No. 07/490013, filed Mar. 7, 1990, now abandoned, are incorporated herein by cross-reference.

BRIEF DESCRIPTION OF THE DRAWINGS

The single accompanying figure is a graph correlating toxin binding and SAc/PV ratio.

DESCRIPTION OF PREFERRED EMBODIMENTS

This invention relates to the use of a method whereby montmorillonite clays exhibiting superior adsorptive capacity for binding aflatoxin can be identified. The method makes use of two kinds of physicochemical measurements: namely, surface acidity and porosity determinations. A mathematical model utilizing these two properties has been empirically derived and found to correlate extremely well with the adsorptive capacity for aflatoxin exhibited by a series of raw montmorillonite clays possessing a wide range of physicochemical properties. Specifically, in vitro adsorption of aflatoxin by raw montmorillonite clays has been found to obey the following model:

$$\%ADS_{aflatoxin} = 1.27 \ (SAc/PV) + 74.6$$

where:

$\%ADS_{aflatoxin}$ = percentage aflatoxin B1 binding to 1 mg clay in 5 ml stock solution (40 ug aflatoxin) at 370° C./60 min.

SAc = surface acidity in 5.0–6.8 pKa range, measured as meq n-butylamine /gm clay.

PV=pore volume (BET method) in 50–600 A pore diameter range, measured as cc/gm clay.

Additives of the invention are utilized as small granules or powders and should be thoroughly mixed with the animal feed by any suitable manner prior to feeding. The terms "animal feed" or "feed ration" as used in the present invention refer to any natural and processed or otherwise modified organic materials which are susceptible to biodeterioration and which can be consumed by animals or birds for nourishment. Examples of such organic materials range from freshly harvested grains to pelletized feeds. The presently preferred animal feeds for use in the instant invention are poultry and livestock feeds.

The clay additives which can be utilized in the instant invention as mycotoxin (such as aflatoxin) inactivating agents are members of the phyllosilicate minerals known as smectite type clays. Structurally, phyllosilicates are essentially made up of layers formed by condensation of sheets of linked $Si(O,OH)_4$ tetrahedra with those of linked $M_{2\text{-}3}(OH_6$ octahedra, where M is either a divalent or trivalent cation or combinations thereof. In addition to possessing the aforementioned properties, smectite clays also possess a lesser amount of mobile (exchangeable) cations that can be easily solubilized when these clays are added to water.

The optional sequestrant portion of the sequestrant/clay formulation includes one or more food-grade sequestrant salts used in food processing. A partial list of such substances includes: sodium, calcium and potassium acetates; sodium, calcium and potassium citrates as well as the free acid and monoisopropyl, monoglyceride stearyl and triethyl derivatives thereof; disodium dihydrogen and disodium calcium salts of ethylenediaminetetraacetic acid (EDTA); calcium and sodium gluconates; oxystearin; ortho phosphates (monocalcium acid, dibasic potassium, sodium aluminum, dibasic sodium, monobasic sodium, tribasic sodium); meta phosphates (calcium hexameta, sodium hexameta); pyro phosphates (tetrasodium, sodium acid); sodium tripolyphosphate; calcium phytate; sodium and sodium potassium tartrates as well as the free acid; sodium thiosulfate and mixtures thereof.

In experimental work that led to the present invention a series of raw montmorillonite clays were obtained which spanned a significant range with respect to variables such as pore volume, surface acidity, surface area and pH. These samples were coded A, B, C, D and E. Samples were dried at 110° C. for 4 hours and ground to pass through a 170 mesh Tyler screen before being tested for their aflatoxin binding capacities. pH was determined by measuring acidity of a slurry of the clay in freshly boiled DI water using a recently calibrated pH meter. Clay slurries ranged from 9—38 wt. % clay on a dry weight basis.

In vitro binding studies were conducted using these clay materials as follows: A weighed sample of dried clay was placed in a clean 16×125 mm disposable glass test tube. To this was added 5.00 ml of Type III water (equivalent to double-distilled deionized water). The tube was gently agitated for 15 sec and then placed in a 37° C. water bath and allowed to equilibrate for 1 hr. After 1 hr, 40 μg of aflatoxin B1 was introduced (in a 1 μg/ul solution). The tube was vortexed for 15 sec at 15 min intervals (15,30, and 45 min). After 1 hr, the tube was centrifuged for 5 min at 1200 rpm to yield a pellet at the bottom of the tube, and a clear supernatant liquor above. The supernatant was carefully decanted into a clean test tube. The supernatant was then extracted to recover the remaining mycotoxin. The supernatant was extracted 3 time with 2 ml portions of dichloromethane. The dichloromethane solutions were combined and evaporated to dryness under a nitrogen stream prior to analysis. The dried residue from the aflatoxin binding study was redissolved in a known volume of chloroform, 2 μl wml of this solution was spotted on HPTLC plate (Analtech) and developed using a 9/1 chloroform/acetone (v/v) solvent system. Quantitation was made by visual comparison to known quantities of aflatoxin B1 spotted on the same plate. Analysis of the aflatoxin controls was by GC/MS as well as HPTLC. All samples were run in triplicate. Tetrahydrofuran (THF) which had been freshly distilled from sodium metal was used as the delivery solvent for aflatoxin B1. The percent recovery of aflatoxin B1 from the supernatant was determined from control samples run for each experiment. The percent recovery of aflatoxin B1 was consistently found to be 100% for each experiment —as confirmed by GC/MS, TLC and HPLC quantitation.

The surface acidity of five clays were measured using a procedure outlined in W. Kladnig's paper (*J. Phy. Chem.*, 80, 262 (1976)), in order to determine whether surface acidity affects aflatoxin binding properties. A description of the experiment and results are presented below.

Vials, caps and septa used in the testing were purchased from Wheaton Company. Glass vials were 8 ml and septa were Teflon-faced silicone. The 5 ml Kimax microburet used had 0.01 ml gradulations. A Luer Lok size 18 removable syringe needle was attached to the tip of the microburet in order to pierce the septa. In some cases a size 17 was also used to release pressure in the vial.

All chemicals used were reagent grade.

KOH pellets were used to dry the n-butylamine. After the 0.0984N solution was made, molecular sieve (Linde 4A by Alfa Products) was added to adsorb any additional moisture.

The 0.1% indicator solutions were made with dry benzene. Their respective color changes and pKas, are listed below in Table 1.

TABLE 1

| Indicator | Color | $pK_a$ |
|---|---|---|
| 1,9-Diphenyl-1,3,6,8-nonatetraena-5-one | R-Y | −3.0 |
| 4-Phenylazodiphenylamine | P-Y | +1.5 |
| p-Dimethylaminoazobenzene | R-Y | +3.3 |
| 4-p-Ethoxyphenylazo-m-phenylenediamine | R-Y | +5.0 |
| Neutral Red | R-Y | +6.8 |

(Y = yellow; R = red; P = purple)

Neutral red and 4-p-ethoxyphenylazo-m-phenylenediamine were obtained as HCl salts. The salts were dissolved in DI water, precipitated with a few drops of NaOH, filtered, and dried under vacuum in a desiccator for 24 hrs. When added to benzene, a portion of the solids did not dissolve, so the solutions were centrifuged and the liquid pipetted into clean bottles.

The sample vials were treated at 500° C. for 4 hours, and placed in a desiccator and stored under 25 in. Hg vacuum until needed. The samples were used as is without further treatment.

Dried clay in amount of 0.10 g was added to each vial, followed by addition of 3 ml of benzene, along with 5 drops of 0.1% indicator solution. Septa and caps were then put on the vials to prevent pickup of moisture in the sample. Immersion in an ultrasonic tank for one minute aided the adsorption of the indicator onto the clay. Care was taken to prevent the vials from sudden movement, which could cause some of the clay to adhere to the walls of the glass and give erroneous results. After adsorption was complete (usually 3–4 hours), the samples were titrated with 0.1N n-butylamine in 0.05 ml increments. (When titrating more than 0.2 ml, the pressure due to displacement prevents the flow of titrant from the buret. In these cases a small syringe was used to pierce the septa and relieve the pressure). After titration, the samples were once again placed in an ultrasonic tank for one minute. Equilibrium was reached within four hours (except for the neutral red indicator which took 16 hours). Once the end point was determined, a new series of titrations were done at 0.01 ml increments in the range of this end point, and treated similarly. About 2 grams of sample per indicator should be adequate for this experiment.

The data, reported as meg/g of clay, are presented in Table 2.

TABLE 2

| Clay | pKa | | | | |
|---|---|---|---|---|---|
| | −3.0 | +1.5 | +3.3 | +5.0 | +6.8 |
| C | — | — | .01 | .05 | .28 |
| A | — | — | .01 | .03 | .48 |
| B | — | — | .02 | .03 | .82 |
| D | — | .05 | .09 | .11 | .86 |
| E | .01 | .02 | .06 | .12 | 1.14 |

This data can also be represented as meg/g in a $pK_a$ range, shown in Table 3.

TABLE 3

| Clay | $pk_a$ Range | | | | |
|---|---|---|---|---|---|
| | less than −3.0 | −3.0 to +1.5 | +1.5 to +3.3 | +3.3 to +5.0 | +5.0 to +6.8 |
| C | — | — | .01 | .04 | .23 |
| A | — | — | .01 | .02 | .45 |
| B | — | — | .02 | .01 | .79 |
| D | — | .05 | .04 | .02 | .75 |
| E | .01 | .01 | .04 | .06 | 1.02 |

Surface area and volume of pores having diameters in the range of 50–600 Angstrom units were determined by conventional nitrogen adsorption techniques, using a Micromeretics ® Digisorb 2500 Automatic Multi-Gas Surface Area and Pore Volume Analyzer. Before being tested for surface area and volume of pores having diameters in the range of 50–600 Angstrom units, the clays were first pretreated by heating them, under vacuum, at about 480° F. for 16 hours. Details of the pore volume calculations obtained using the Digisorb 2500 equipment appear in a publication, "Materials Analysis Laboratory Application Note," Number 002, Aug. 17, 1972 provided by the supplier, Micromeretics Instrument Corporation, Norcross, Ga. 30093.

Table 4 lists the aflatoxin binding vs. physico-chemical properties for the montmorillonite clays used in this series. Table 5 lists the chemical analyses for these clays.

TABLE 4

AFLATOXIN BINDING VS. PHYSICOCHEMICAL PROPERTIES

| Source Clay | Toxin Binding(1) (WT %) | PV(2) (cc/gm) | SAc(3) (meg/gm) | SAc/PV Ratio | Surface Area ($m^2$/gm) | pH(4) (slurry) | Vm(5) (WT %) |
|---|---|---|---|---|---|---|---|
| A | 79.5 | 0.085 | 0.45 | 5.3 | 52 | 7.95 | 23.4 |
| C | 84 | 0.041 | 0.23 | 5.6 | 23 | 9.68 | 13.8 |
| D | 86.4 | 0.068 | 0.75 | 11.0 | 42 | 5.51 | 18.9 |
| B | 89.2 | 0.071 | 0.79 | 11.1 | 50 | 8.75 | 17.6 |

TABLE 4-continued

| | AFLATOXIN BINDING VS. PHYSICOCHEMICAL PROPERTIES | | | | | | |
|---|---|---|---|---|---|---|---|
| Source Clay | Toxin Binding(1) (WT %) | PV(2) (cc/gm) | SAc(3) (meq/gm) | SAc/PV Ratio | Surface Area (m²/gm) | pH(4) (slurry) | Vm(5) (WT %) |
| E | 93.1 | 0.073 | 1.02 | 13.9 | 46 | 5.10 | 17.1 |

(1) Binding at 37° C./60 min./1 mg clay/40 ug aflatoxin B1.
(2) Pore volume in 50-600 A pore diameter range; cc/gm clay.
(3) Surface acidity in 5.0-6.8 pKa range; meq n-butylamine/gm clay.
(4) Slurry solids at 9-38 wt %.
(5) Volatile matter (wt % loss) upon heating overnight at 200° C.

TABLE 5

| | CHEMICAL ANALYSIS (WT %) | | | | | | | | EXCHANGEABLE CATIONS (meq/100 g) | | | | | EXCHANGE CATION RATIO (Divalent + trivalent/ monovalent) |
|---|---|---|---|---|---|---|---|---|---|---|---|---|---|---|
| | $SiO_2$ | $Al_2O_3$ | $Fe_2O_3$ | MgO | CaO | $Na_2O$ | $K_2O$ | Clay Type | $Ca^{+2}$ | $Mg^{+2}$ | $Na^+$ | $K^+$ | $Al + Fe^{+3}$ | |
| A | 67.6 | 20.7 | 2.82 | 5.44 | 3.32 | 0.37 | 0.19 | Ca-montmorillonite | 137.9 | 15.8 | 4.25 | .38 | | 33.2 |
| B | 67.1 | 19.4 | 5.87 | 3.85 | 3.10 | 0.30 | 0.44 | Ca-montmorillonite | 115.4 | 19.2 | 5.18 | .94 | | 22.0 |
| C | 63.5 | 21.1 | 5.08 | 3.41 | 4.10 | 2.12 | 0.70 | Na-montmorillonite | 58.0 | 10.0 | 41.7 | 2.01 | | 1.56 |
| D | 67.2 | 22.1 | 3.80 | 4.16 | 1.27 | 0.32 | 1.16 | Ca/Al-montmorillonite | 25.7 | 10.2 | 5.74 | .32 | 45.4 | 13.4 |
| E | 70.7 | 20.0 | 1.19 | 4.67 | 2.29 | 0.66 | 0.51 | Ca/Na-montmorillonite | 57.1 | 20.2 | 11.2 | .41 | | 6.67 |

From the data on aflatoxin binding efficiency on raw clay, Table 4, the order of binding, in descending order, is E, B, D, C, and A. As is clear from an examination of data in the above tables there was no simple relationship between the in vitro aflatoxin binding capacity of these various clays and any single physical or chemical property such as pore volume, surface area, surface acidity, or pH. Note that these clays span a significant range with respect to these variables; pore volumes ranged from 0.041 to 0.85 cc/gm, surface acidities (in the 5.0-6.8 pKa range) varied from 0.23 to 1.02 meq n-butylamine/gm clay, surface area ranged from 23-52 m²/gm and pH of slurry ranged from a slightly acidic 5.10 to a moderately basic 9.68.

It was found, however, that a good correlation ($r^2 = 0.87$) existed between aflatoxin binding capacity of these clays and the ratio of their surface acidity to pore volume when surface acidities are measured with Hammett indicators whose pKa values fall between 5.0 and 6.8, and when the pore volumes include all pores whose diameters fall in the range between 50 and 600 A. These data are presented as a graph in the accompanying figure. Physically what these results imply is that porosity in the larger pore diameter region and weaker acid sites seem to be the most effective from the standpoint of aflatoxin adsorption.

Thus, the present invention provide a simple ready means for selecting clay suitable for use in binding mycotoxins which discriminates between useful and useless or less useful clays without the need to carry out preliminary mycotoxin binding studies which may, however, be carried out after this initial selection process is carried out.

What is claimed is:

1. A dry solid animal feed composition in which biodegradable feed is contaminated with a mycotoxin and is admixed with of a calcium montmorillonite in an amount ranging from about 0.05 to 1.5 weight percent of the composition selected to have a ratio of surface acidity divided by porosity greater than 6, wherein surface acidity of said calcium montmorillonite is for sites whose pKa values fall in the range of 5.0-6.8 and porosity is for pores who diameters fall in the range of 50-600 Angstrom units.

2. The feed composition of claim 1 wherein said ratio is greater than 10.

3. The feed composition of claim 1 wherein said ratio is in the range of 11-14.

4. The composition of claim 1 wherein said calcium montmorillonite has exchangeable cations whose /monovalent cation ratio is greater than 7.

5. A dry solid animal feed composition in which the feed is contaminated with a mycotoxin admixed with from about 0.025 to 1.5% by weight of a calcium/sodium bentonite selected to possess a ratio of surface acidity divided by porosity greater than 6, wherein surface acidity is for sites whose pKa values fall in the range of 5.0-6.8 and porosity is for pores whose diameters are in the range of 50-600 Angstrom units.

* * * * *